United States Patent
Ke et al.

(10) Patent No.: US 11,094,028 B2
(45) Date of Patent: Aug. 17, 2021

(54) SYSTEM AND METHOD FOR DETERMINING PASSENGER-SEEKING RIDE-SOURCING VEHICLE NAVIGATION

(71) Applicant: BEIJING DIDI INFINITY TECHNOLOGY AND DEVELOPMENT CO., LTD., Beijing (CN)

(72) Inventors: Jintao Ke, Beijing (CN); Guojun Wu, Beijing (CN); Zhengtian Xu, Beijing (CN); Hai Yang, Beijing (CN); Yafeng YiN, Beijing (CN); Jieping Ye, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 0 days.

(21) Appl. No.: 16/703,945

(22) Filed: Dec. 5, 2019

(65) Prior Publication Data

US 2020/0175635 A1    Jun. 4, 2020

Related U.S. Application Data

(63) Continuation of application No. PCT/CN2018/080927, filed on Mar. 28, 2018.

(51) Int. Cl.
    *G06Q 50/30* (2012.01)
    *G06N 7/00* (2006.01)
    *G06Q 30/02* (2012.01)

(52) U.S. Cl.
    CPC ............. *G06Q 50/30* (2013.01); *G06N 7/005* (2013.01); *G06Q 30/0208* (2013.01)

(58) Field of Classification Search
    CPC ..... G06Q 50/30; G06Q 30/0208; G06N 7/005
    (Continued)

(56) References Cited

U.S. PATENT DOCUMENTS

| 9,769,616 B1* | 9/2017 | Pao .................. H04W 4/44 |
| 2011/0125514 A1* | 5/2011 | Molaison ............... G01C 21/20 |
| | | 705/2 |

(Continued)

FOREIGN PATENT DOCUMENTS

| CN | 104169990 A | 11/2014 |
| CN | 104657883 A | 5/2015 |

(Continued)

OTHER PUBLICATIONS

Caplice, Sheffi, "Optimization-Based Procurement for Transportation Services," Journal of Business Logistics, vol. 24, No. 2 (2003) (Year: 2003).*

(Continued)

*Primary Examiner* — Michael P Harrington
*Assistant Examiner* — Mark C Clare
(74) *Attorney, Agent, or Firm* — Sheppard Mullin Richter & Hampton LLP

(57) ABSTRACT

A method comprises: obtaining historical vehicle service data in an area for a time period including historical locations of passenger-seeking vehicles with respect to time, historical locations of passenger orders with respect to time, and historical trip fares with respect to pick-up locations and time; discretizing the area into a plurality of zones and discretizing the time period into a plurality of time segments; aggregating the historical vehicle service data according the zones and time segments; obtaining an expected reward for a passenger-seeking vehicle to move from zone A to each neighboring zone of the zone A based on the aggregated historical vehicle service data; and obtaining a probability of a passenger-seeking vehicle moving from zone A to a neighboring zone B based on the expected reward for the passenger-seeking vehicle to move from zone A to the each neighboring zone of the zone A.

19 Claims, 11 Drawing Sheets

(58) Field of Classification Search
USPC .......................................................... 705/13
See application file for complete search history.

(56) References Cited

U.S. PATENT DOCUMENTS

| | | | |
|---|---|---|---|
| 2011/0246404 | A1 | 10/2011 | Lehmann et al. |
| 2014/0058956 | A1* | 2/2014 | Raines ............... G06Q 30/0201 |
| | | | 705/306 |
| 2014/0161447 | A1* | 6/2014 | Graves ............... H04Q 11/0062 |
| | | | 398/48 |
| 2014/0340242 | A1 | 11/2014 | Belzner et al. |
| 2015/0046083 | A1* | 2/2015 | Maitra .................... H04L 67/12 |
| | | | 701/465 |
| 2016/0335576 | A1 | 11/2016 | Peng |
| 2017/0046644 | A1* | 2/2017 | Zhang .............. G06Q 10/06311 |
| 2017/0083831 | A1* | 3/2017 | Ghosh .................... G06Q 10/06 |
| 2017/0227370 | A1* | 8/2017 | O'Mahony ........ G01C 21/3453 |
| 2018/0025407 | A1* | 1/2018 | Zhang ............... G06Q 30/0635 |
| | | | 705/26.81 |
| 2018/0240054 | A1* | 8/2018 | Li .................... G06Q 10/06311 |
| 2018/0260778 | A1* | 9/2018 | Mazetti ............. G06Q 10/0875 |
| 2018/0336653 | A1* | 11/2018 | Levi ....................... G06Q 50/30 |
| 2019/0120640 | A1* | 4/2019 | Ho ......................... G06Q 50/30 |

FOREIGN PATENT DOCUMENTS

| | | |
|---|---|---|
| CN | 105117790 A | 12/2015 |
| CN | 106530188 A | 3/2017 |
| CN | 107402931 A | 11/2017 |
| CN | 107545319 A | 1/2018 |
| GB | 2550798 A | 11/2017 |

OTHER PUBLICATIONS

Examination Report in European Application No. 18911618.9 dated Mar. 6, 2020, 9 pages.
International Search Report in PCT/CN2018/080927 dated Jan. 4, 2019, 5 pages.
Written Opinion in PCT/CN2018/080927 dated Jan. 4, 2019, 4 pages.
Colin P.D. Biirch et al., "Modelling the Effects of Patch Size on Vegetation Dynamics: Bracken (Pteridium aquilinum (L.) Kuhn) under Grazing", Annals of Bontany, 85 (Suppl. B), 2000, pp. 63-76.
Xiqun (Michael) Chen et al., "Understanding Ridesplitting Behavior of On-Demand Ride Services: An Ensemble Learning Approach", Transportation Research Part C: Emerging Technologies, 76, pp. 51-70.
Arthur S. De Vany, "Capacity Utilization under Alternative Regulatory Constraints: An Analysis of Taxi Markets", Journal of Political Economy, vol. 83, No. 1, Feb. 1975, pp. 83-94.
George W. Douglas, "Price Regulation and Optimal Service Standards: The Taxicab Industry", Journal of Transport Economics and Policy, vol. 6(2), May 1972, pp. 116-127.
Jintao Ke et al., "Short-Term Forecasting of Passenger Demand under On-Demand Ride Services: A Spatio-Temporal Deep Learning Approach", arXiv:1706.06279v1 [cs.LG] Jun. 20, 2017, pp. 1-39.
J.A. Hartigan et al., "Algorithm AS 136: A K-means Clustering Algorithm", Journal of the Royal Statistical Society. Series C (Applied Statistics), 28(1), 1979, pp. 100-108.
Fang He et al., "Modeling Taxi Services with Smartphone-Based e-hailing Applications", Transportation Research Part C: Emerging Technologies, 58, 2015, pp. 93-106.
Fang He et al., "Pricing and penalty/compensation strategies of a taxi-hailing platform", Transportation Research Part D: Emerging Technologies, 86, 2018, pp. 263-279.
Yu (Marco) Nie, "How Can the Taxi Industry Survive the Tide of Ridesourcing? Evidence from Shenzhen, China", Transportation Research Part C: Emerging Technologies, 79, Jun. 2017, pp. 242-256.

Elizaveta Pachepsky et al., "Towards a General Theory of Biodiversity", Nature 410, Apr. 19, 2001, pp. 923-926.
San Francisco Municipal Transportation Agency, 2015, Travel Decisions Survey 2015, Summary Report.
R.M.N.T. Sirisoma et al., "Empirical Evidence for Taxi Customer-Search Model", In Proceedings of the Institution of Civil Engineers: Transport, 163, Issue TR4, pp. 203-210.
Wai Yuen Szeto et al., "A Time-Dependent Logit-Based Taxi Customer-Search Model, "International Journal of Urban Sciences, 17(2), 2013, pp. 184-198.
Jinjun Tang et al., "A Two-Layer Model for Taxi Customer Searching Behaviors Using GPS Trajectory Data", IEEE Transactions on Intelligent Transportation Systems, 17(11), 2016, pp. 3318-3324.
Xiaolei Wang et al., "Pricing Strategies for a Taxi-Hailing Platform", Transportation Research Part E: Logistics and Transportation Review, 93, 2016, pp. 212-231.
K.I. Wong et al., "Modeling the Bilateral Micro-Searching Behavior for Urban Taxi Services Using the Absorbing Markov Chain Approach", Journal of Advanced Transportation, 39(1), 2005, pp. 81-104.
R.C.P. Wong et al., "A Cell-Based Logit-Opportunity Taxi Customer-Search Model", Transportation Research Part C Emerging Technologies, 48,2014, pp. 84-96.
R.C.P. Wong et al., "Bi-Level Decisions of Vacant Taxi Drivers Traveling Towards Taxi Stands in Customer-Search Modeling Methodology and Policy Implications", Transport Policy, 33, 2014, pp. 73-81.
R.C.P. Wong et al., "Modelling Multi-Period Customer-Searching Behaviour of Taxi Drivers", Transportmetrica B Transport Dynamics, 2(1), 2014, pp. 40-59.
R.C.P. Wong et al., "A Two-Stage Approach to Modeling Vacant Taxi Movements", Transportation Research Procedia, 7, pp. 254-275, 21st International Symposium on Transportation and Traffic Theory, ISTTT21 2015, Aug. 5-7, 2015, Kobe, Japan.
R.C.P. Wong et al., "Behavior of Taxi Customers in Hailing Vacant Taxis: A Nested Logit Model for Policy Analysis", Journal of Advanced Transportation, 49(8), 2015, pp. 867-883.
Ryan C.P. Wong et al., "Sequential Logit Approach to Modeling the Customer-Search Decisions of Taxi Drivers", Asian Transport Studies, 3(4), 2015, pp. 398-415.
K.I. Wong et al., "Modeling Urban Taxi Services with Multiple User Classes and Vehicle Types", Transportation Research, Part B 42 (10), 2008, 985-1007.
Zhengtian Xu et al., "Optimal Parking Provision for Ride-Sourcing Services", Transportation Research Part B Methodological, 105, 2017, pp. 559-578.
Hai Yang et al., "A Network Model of Urban Taxi Services", Transportation Research Part B 32 (4), 1998, pp. 235-246.
Hai Yang et al., "Regulating Taxi Services in the Presence of Congestion Externalities", Transportation Research Part A 39 (1), 2005, pp. 17-40.
Hai Yang et al., "A Multi-Period Dynamic Model of Taxi Services with Endogenous Service Intensity", Operations Research, vol. 53, No. 3, May-Jun. 2005, pp. 501-515.
Hai Yang et al., "Nonlinear Pricing of Taxi Services", Transportation Research Part A Policy and Practice, 44(5), 2010, pp. 337-348.
Hai Yang et al., "Equilibria of Bilateral Taxi-Customer Searching and Meeting on Networks", Transportation Research, Part B 44, 2010,1067-1083.
Hai Yang et al., "Equilibrium Properties of Taxi Markets with Search Frictions", Transportation Research Part B 45 (4), 2011, pp. 696-713.
M. Anil Yazici et al., "Modeling Taxi Drivers' Decisions for Improving Airport Ground Access: John F. Kennedy airport case". Transportation Research Part A: Policy and Practice, 91,2016, pp. 48-60.
Jiayi Joey Yu et al., Should On-Demand Ride Services Be Regulated? An Analytical Evaluation of Chinese Government Policies, 2017, pp. 1-51.
Liteng Zha et al., "Surge Pricing and Labor Supply in the Ride-Sourcing Market", Transportation Research Procedia 23C, 2017, pp. 2-21.

(56) References Cited

OTHER PUBLICATIONS

Brian D. Ziebart et al., "Maximum Entropy Inverse Reinforcement Learning", Proceedings of the 23rd AAAI Conference on Artificial Intelligence, vol. 8, Jul. 2008, pp. 1433-1438.
Brian D. Ziebart et al., "Navigate Like a Cabbie: Probabilistic Reasoning from Observed Context-Aware Behavior", ACM, In Proceedings of the 10th International Conference on Ubiquitous Computing, Sep. 21-24, 2008, Seoul, Korea, pp. 322-331.
Examination Report No. 1 dated Nov. 25, 2020, issued in related Australian Application No. 2018415763 (4 pages).
PCT International Preliminary Report on Patentability dated Oct. 8, 2020, issued in related International Application No. PCT/CN2018/080927 (5 pages).
Notice of Reasons for Refusal dated Mar. 23, 2021, issued in related Japanese Application No. 2019-572061, with English machine translation (10 pages).

* cited by examiner

400

401 — Obtaining historical vehicle service data in an area for a time period, the historical vehicle service data including historical locations of passenger-seeking vehicles with respect to time, historical locations of passenger orders with respect to time, and historical trip fares with respect to pick-up locations and time

402 — Discretizing the area into a plurality of zones and discretizing the time period into a plurality of time segments

403 — Aggregating the historical vehicle service data according the zones and time segments

404 — Obtaining an expected reward for a passenger-seeking vehicle to move from zone A to each neighboring zone of the zone A based on the aggregated historical vehicle service data

405 — Obtaining a probability of a passenger-seeking vehicle moving from zone A to a neighboring zone B based on the expected reward for the passenger-seeking vehicle to move from zone A to the each neighboring zone of the zone A

FIG. 4

SYSTEM AND METHOD FOR DETERMINING PASSENGER-SEEKING RIDE-SOURCING VEHICLE NAVIGATION

CROSS-REFERENCE TO RELATED APPLICATION

This application is a Continuation of International Application No. PCT/CN2018/080927, filed on Mar. 28, 2018, the entire content of which is hereby incorporated by reference.

TECHNICAL FIELD

This disclosure generally relates to systems and methods for determining ride-sourcing vehicle navigation.

BACKGROUND

With the boom of mobile internet technology, ride-sourcing services have been becoming an increasingly important travel mode for commuters and other types of passengers. Ride-sourcing platforms can provide a much more efficient information bridge between drivers and passengers than the traditional taxi services, and hence reduce search frictions (obstacles to the matching the supply with the demand and cost of the process of finding a match). Due to its effectiveness, efficiency, and relatively low price, ride-sourcing services are growing in popularity. Among various factors, it is important to model movements of vehicles, based on which policies can be developed to further reduce the search frictions and increase the overall transportation efficiency.

SUMMARY

Various embodiments of the present disclosure can include systems, methods, and non-transitory computer readable media configured to determine passenger-seeking ride-sourcing vehicle navigation. According to one aspect, an exemplary method for determining passenger-seeking ride-sourcing vehicle navigation may comprise: obtaining historical vehicle service data in an area for a time period, the historical vehicle service data including historical locations of passenger-seeking vehicles with respect to time, historical locations of passenger orders with respect to time, and historical trip fares with respect to pick-up locations and time; discretizing the area into a plurality of zones and discretizing the time period into a plurality of time segments; aggregating the historical vehicle service data according the zones and time segments; obtaining an expected reward for a passenger-seeking vehicle to move from zone A to each neighboring zone of the zone A based on the aggregated historical vehicle service data; and obtaining a probability of a passenger-seeking vehicle moving from zone A to a neighboring zone B based on the expected reward for the passenger-seeking vehicle to move from zone A to the each neighboring zone of the zone A.

According to another aspect, a non-transitory computer-readable storage medium storing instructions that, when executed by one or more processors, cause the one or more processors to perform a method for determining passenger-seeking ride-sourcing vehicle navigation. The method may comprise: obtaining historical vehicle service data in an area for a time period, the historical vehicle service data including historical locations of passenger-seeking vehicles with respect to time, historical locations of passenger orders with respect to time, and historical trip fares with respect to pick-up locations and time; discretizing the area into a plurality of zones and discretizing the time period into a plurality of time segments; aggregating the historical vehicle service data according the zones and time segments; obtaining an expected reward for a passenger-seeking vehicle to move from zone A to each neighboring zone of the zone A based on the aggregated historical vehicle service data; and obtaining a probability of the passenger-seeking vehicle moving from zone A to a neighboring zone B based on the expected reward for a passenger-seeking vehicle to move from zone A to the each neighboring zone of the zone A.

According to another aspect, a system for determining passenger-seeking ride-sourcing vehicle navigation may comprise one or more processors and a non-transitory computer-readable storage medium storing instructions that, when executed by the one or more processors, cause the one or more processors to perform a method. The method may comprise: obtaining historical vehicle service data in an area for a time period, the historical vehicle service data including historical locations of passenger-seeking vehicles with respect to time, historical locations of passenger orders with respect to time, and historical trip fares with respect to pick-up locations and time; discretizing the area into a plurality of zones and discretizing the time period into a plurality of time segments; aggregating the historical vehicle service data according the zones and time segments; obtaining an expected reward for a passenger-seeking vehicle to move from zone A to each neighboring zone of the zone A based on the aggregated historical vehicle service data; and obtaining a probability of a passenger-seeking vehicle moving from zone A to a neighboring zone B based on the expected reward for the passenger-seeking vehicle to move from zone A to the each neighboring zone of the zone A.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4 illustrates a flowchart of an exemplary method for determining passenger-seeking ride-sourcing vehicle navigation, in accordance with various embodiments.

DETAILED DESCRIPTION

Figure 1:
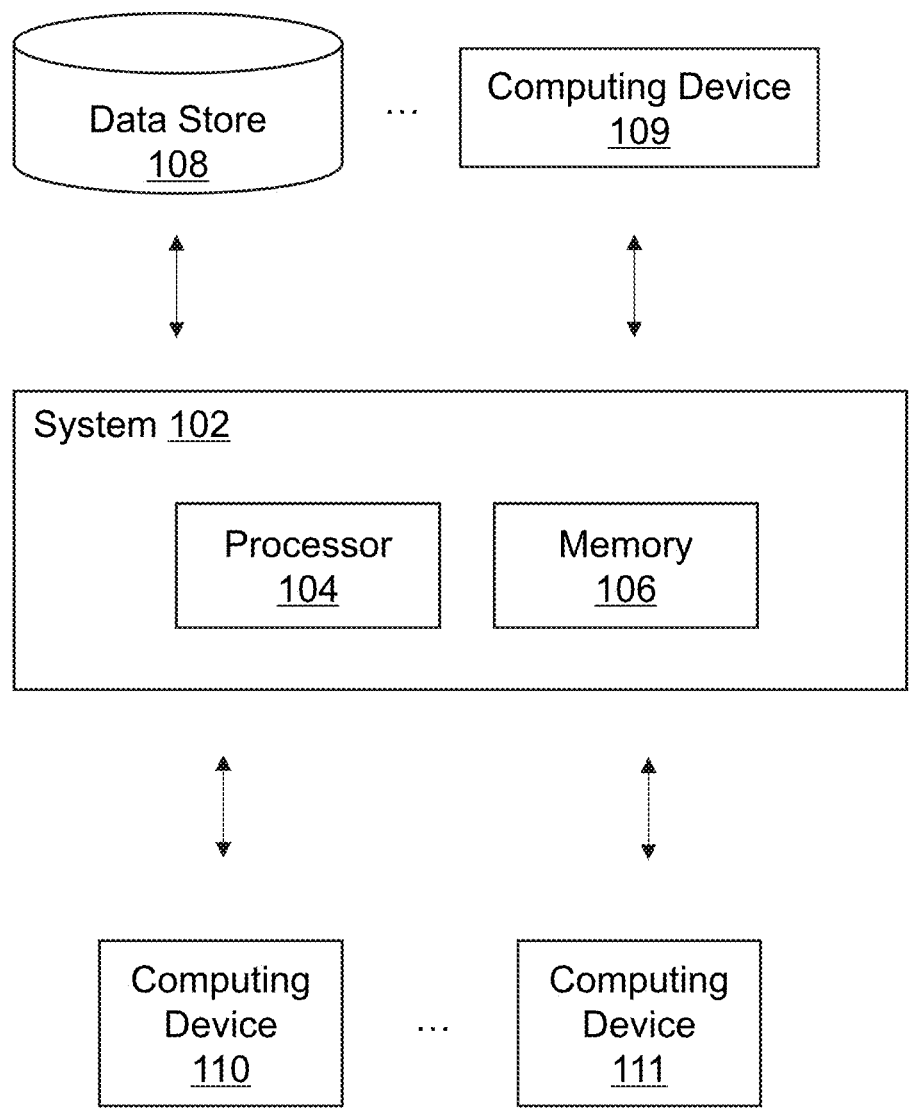
FIG. 1 illustrates an exemplary environment for determining passenger-seeking ride-sourcing vehicle navigation, in accordance with various embodiments.

Vehicle platforms may be provided for transportation services. Such vehicle platform may also be referred to as a vehicle hailing, vehicle dispatching, or ride-sourcing platform, accessible through devices such as mobile phones installed with a platform application. Via the application, users (transportation requestors) can transmit transportation requests (e.g., a pick-up location, a destination) to the vehicle platform. The ride-sourcing platform may relay the requests to vehicle drivers. Sometimes, two or more passengers/passenger groups may request to carpool in the same vehicle. The vehicle drivers can choose from and accept the requests, picking up and dropping off the passengers, and be rewarded accordingly.

Despite the growing trend of passengers hailing ride-sourcing vehicles, no model has been developed to simulate vehicle routing choices for vacant vehicles that are seeking passengers ("vacant" in this disclosure may refer to a vehicle with no passenger onboard but with its driver onboard and probably seeking for passengers). Although some existing models describe behavior for traditional taxis, these models cannot be applied to ride-sourcing vehicles for various reasons. Unlike the taxis which cruise in the streets to pick up passengers on-the-go, the ride-sourcing platform receives transportation requests in the form of pick-up orders from the passengers, and then dispatches each order to one of the nearby vacant drivers. For ride-sourcing vehicles, the drivers need to receive the requests to pick up the passengers from determined locations, and otherwise will be penalized by the platform. For example, a ride-sourcing vehicle driver may be penalized by deduction of service score or withdrawal of subsidy/award, for canceling more than three orders in one day. Due to such different matching modes between the ride-sourcing and traditional taxi services, the ride-sourcing drivers have different behaviors from traditional taxi drivers, especially when vacant and passenger-seeking. On the other hand, with the help of the internet-based matching system, the ride-sourcing platform can provide richer and more accurate vehicle information than traditional taxi GPS records and surveys.

To provide a robust model for simulating passenger-seeking ride-sourcing vehicles and at least mitigate the disadvantages of existing technologies described above, systems, methods, and non-transitory computer readable media for modeling passenger-seeking ride-sourcing vehicle movement are disclosed. In various embodiments, a logit-based model is disclosed for modeling passenger-seeking ride-sourcing vehicle movement.

For example, a logit-based zonal choice model is disclosed for characterizing vacant ride-sourcing drivers' passenger-seeking behaviors. In this model, vacant ride-sourcing drivers are modeled to move among hexagon-based cells. The model considers factors retrieved from both requested orders (demand-side) and ride-sourcing car GPS trajectories (supply-side). The requested orders provide factors including the number of requested orders, the answer rate (the ratio of matched orders to the requested orders), expected passenger waiting time, expected trip fare, and expected pickup time. From the GPS data, the expected vacant drivers' staying time can be defined as the ratio of the drivers' total vacant time to the number of drivers, which reflects the supply intensity and drivers' opportunity cost. This model may assume that the vacant ride-sourcing drivers do not have a clear destination when they become vacant, but move towards one of adjacent zones by comparing the reward of these candidate zone as well as the reward of the subsequent probable zones they may reach. The reward is represented by the explanatory variables, including the number of requested orders (reflecting the demand intensity), mean trip fare, mean pickup time, mean drivers' cruising time, etc. The model depicts drivers' passenger-seeking behaviors in an elaborate spatio-temporal manner, and indicates that the explanatory variables vary across time (e.g., each 5-min interval) and space (e.g., each hexagon with 660 m-long side length), under which the ride-sourcing drivers could make different decisions. The model can be validated in a large-scale ride-sourcing dataset with both supply-side information (the GPS trajectories of ride-sourcing drivers) and demand-side information (vehicle service orders requested by customers). To improve the efficiency of model calibration, a tailored maximum likelihood estimate (MLE) approach is applied. MLE is more efficient than standard multinomial logit model and can be used for calibrating the coefficients of the explanatory variables and then testing the significance of each coefficient.

The disclosed systems and methods are distinguishable from current technologies at least for the following reasons.

1) The disclosed model is one of the first to simulate movements of customer-seeking ride-sourcing vehicles. For example, a disclosed logit-based zonal choice model simulates ride-sourcing drivers' time-variant passenger-seeking movements among hexagon-shaped zones.

2) This disclosed model has advantages for strong explanation of the explanatory variables, convenient incorporation with statistical hypothesis testing, and easy implementation and calibration.

3) The disclosed model provides important results for enhancing vehicle platform service and improving transportation efficiency. For example, the modeling results show that the drivers' passenger-seeking behaviors are mostly influenced by the requested orders in the nearby zones, and drivers might have some "irrational" passenger-seeking behaviors. For example, drivers could flow over into heated zones and suffer from long cruising time and pickup time. The result can be relied on by the ride-sourcing platform and traffic operator to impose incentivized mechanisms, such as vacant route recommendation, optimal dispatching, and spatio-temporal subsidy/pricing strategies, for reducing search frictions.

FIG. 1 illustrates an exemplary environment 100 for determining passenger-seeking ride-sourcing vehicle navigation, in accordance with various embodiments. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein, such as methods for modeling passenger-seeking ride-sourcing vehicle discussed below with reference to FIG. 2B to FIG. 4 (e.g., method 400 and its corresponding descriptions). The system 102 may be implemented on or as various devices such as server, computer, etc. The system 102 may be installed with appropriate software and/or hardware (e.g., wires, wireless connections, etc.) to access other devices of the environment 100. In some embodiments, the system 102 may embody a system for modeling passenger-seeking ride-sourcing vehicle.

The environment 100 may include one or more data stores (e.g., data store 108) and one or more computing devices (e.g., computing device 109, 110, or 111) that are accessible to the system 102. In some embodiments, the system 102 may be configured to obtain data (e.g., historical vehicle service data) from the data store 108 (e.g., database or dataset of historical transportation trips) and/or the computing device 109, 110, or 111 (e.g., computer, server, tablet, wearable device (smart watch), mobile phone used by driver or passenger that captures transportation trip information such as time, location, and fees). The location may comprise GPS (Global Positioning System) coordinates of a vehicle.

Although shown as single components in this figure, it is appreciated that the system 102, the data store 108, and the computing device 109 can be implemented as single devices or multiple devices coupled together, or two or more of them can be integrated together. The system 102 may be implemented as a single system or multiple systems coupled to each other. In general, the system 102, the computing device 109, the data store 108, and the computing devices 109, 110, and 111 may be able to communicate with one another through one or more wired or wireless networks (e.g., the Internet) through which data can be communicated.

In some embodiments, the system 102 or a similar system coupled to the system 102 may implement an online information or service platform. The service may be associated with ride-sourcing vehicles (e.g., cars, bikes, boats, airplanes, etc.), and the platform may be referred to as a vehicle (service hailing or ride-sourcing) platform. The platform may accept requests for transportation, identify vehicles to fulfill the requests, arrange for pick-ups, and process transactions. For example, a user may use the computing device 111 (e.g., a mobile phone installed with a software application associated with the platform) to request transportation from the platform. The system 102 may receive the request and relay it to various vehicle drivers (e.g., by posting the request to mobile phones carried by the drivers). One of the vehicle drivers may use the computing device 110 (e.g., another mobile phone installed with the application associated with the platform) to accept the posted transportation request and obtain pick-up location information. Trip fares (e.g., transportation fees) can be transacted among the system 102 and the computing devices 110 and 111. The driver can be compensated for the transportation service provided. Some platform data may be stored in the memory 106 or retrievable from the data store 108 and/or the computing devices 109, 110, and 111.

Figure 2A:
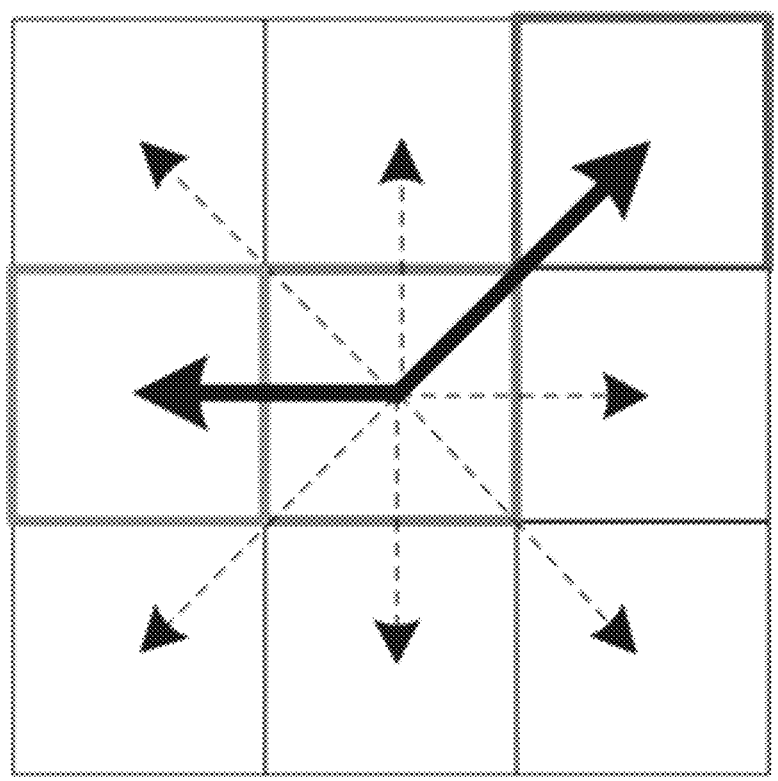
FIG. 2A illustrates an exemplary square lattice according to prior art.
Figure 2B:
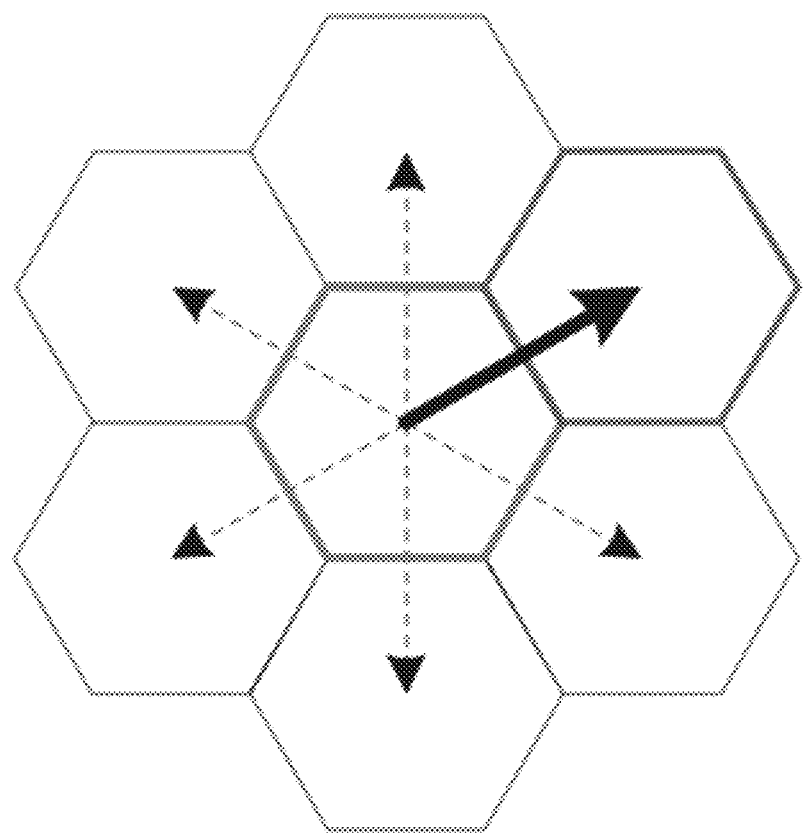
FIG. 2B illustrates an exemplary hexagon lattice for determining passenger-seeking ride-sourcing vehicle navigation, in accordance with various embodiments of the present disclosure.

FIG. 2A illustrates an exemplary square lattice according to prior art. FIG. 2B illustrates an exemplary hexagon lattice for determining passenger-seeking ride-sourcing vehicle navigation, in accordance with various embodiments of the present disclosure. In various embodiments, to model drivers' zonal choice behaviors, drivers' movements and decisions are defined. For example, a vacant (having no passenger) ride-sourcing vehicle's passenger-seeking trajectory Tr obtained with GPS may be represented by a sequence of space-time states ($lat_i$, $lng_i$, $\tau_i$), where $lat_i$, $lng_i$, $\tau_i$ are the latitude, longitude, and time of the ith GPS record. Accordingly, a region (e.g., a whole city) can be partitioned into various zones, each of which being side-connected with several adjacent zones. In the prior art of transportation/urban computing shown in FIG. 2A, the region was partitioned into various square lattices. However, the disclosed model may employ regular hexagon lattices shown in FIG. 2B as the zone units for their advantages over square lattices. One of the main advantages is that each hexagon has six symmetrically equivalent and unambiguous side-adjacent neighbor hexagons. However, each square has two kinds of neighbors: side-connected neighbors (each neighbor square that shares a side with the current square) and corner-connected neighbors (each neighbor square that share a only corner with the current square), which makes the choices (adjacent zones) of drivers' passenger-seeking decision asymmetric.

In some embodiments, the hexagonal discrete global grid system may be used to seamlessly partition an investigated area into various hexagons (e.g., side lengths around 660 meters for each hexagon). With the hexagonal zones determined, each coordinate of GPS record ($lat_i$, $lng_i$) can be mapped to one of the zones. Then Tr can be transferred to a new transition Tr' with a sequence of zone-time state ($z_i$, $\tau_i$), where $z_i$ is the zone ($lat_i$, $lng_i$) belonged to. To simplify the model, two assumptions can be made on drivers' passenger-seeking decisions.

Assumption 1) Each driver at zone $z_i$ decides to stay in the zone $z_i$ or move to one of the adjacent zones of $z_i$ at each decision. The driver makes the decision by comparing the expected profitability of these adjacent zones. Since the GPS points are roughly recorded each 3 second, the area of one zone is large enough to ensure that the one driver cannot move from zone $z_i$ to the zones outside its adjacent zones in an interval of 3 seconds.

Assumption 2) Once a driver moves from zone $z_i$ to one of its adjacent zones, $z_j$, the movement can be treated as an observation of passenger-seeking decision from $z_i$ to $z_j$. If the driver's staying time in zone $z_i$ is larger than a certain time internal $\delta$, it can be treated as an observation of passenger-seeking decision from $z_i$ to $z_i$. For example, in the disclosed model, it is configured that $\delta$=5 min.

In some embodiments, a discrete choice model is used to model drivers' passenger-seeking decision. For example, the time of a day can be discretized into various 5-min time intervals, and the explanatory variables for characterizing vacant drivers' passenger-seeking behaviors are aggregated within each time interval. Accordingly, the drivers' passenger-seeking decision can be modeled as Eq. 1.

$$P_{ij}^t = \frac{\exp(\beta' X_{ij}^t)}{\sum_{k \in A(i)} \exp(\beta' X_{ik}^t)} \quad (1)$$

Where $P_{ij}^t$ refers to the probability of vacant vehicle moving from zone $z_i$ to zone $z_j$, $X_{ij}^t$ refers to the expected reward (represented by the explanatory variables) for the movement from zone $z_i$ to zone $z_j$. $\beta$ denotes the vector of different explanatory variables, indicating drivers' preference on these variables. A positive/negative $\beta_n$ (the nth element of $\beta$) implies drivers' preferred zones are positively/negatively related with the nth explanatory variable, while the magnitude of $\beta_n$ reflects the intensity of the preference. A(i) means the set of adjacent zones of zone $z_i$, implying the passenger-seeking choice set of drivers in zone $z_i$.

Various explanatory variables are described below. In some embodiments, each order collected from ride-sourcing platform data may comprise a request time $\tau_r$ (when passenger request an order), a dispatched time $\tau_d$ (when the order is dispatched to a driver), an arrive time $\tau_a$ (when the driver arrives at the location requested), a begin-charge time $\tau_b$ (the begin of the trip), and a finish time $\tau_f$ (the end of the trip). The latitudes and longitudes of the driver at $\tau_d$, $\tau_b$, and $\tau_f$ are recorded and denoted $(lat_d, lng_d)$, $(lat_b, lng_b)$, and $(lat_f, lng_f)$. The following explanatory variables may affect drivers' passenger-seeking behaviors and can be used to determine the expected reward. As above-mentioned, the explanatory variables are aggregated and considered each 5-min interval, and may include the following.

Expected pickup time: the pickup time of the mth order $pt_m = \tau_a - \tau_d$, and the expected pickup time of zone $z_i$ in time interval t, $PT_i^t$, equal to the mean of pickup time of all the orders with $(lat_a, lng_d)$ in zone $z_i$ and with $\tau_d$ in t. That is, in some embodiments, the expected pickup time for one of the time segments comprises a historical average pick-up time for passenger-seeking vehicles to pick up passengers in zone A; the pick-up time is a time difference between a time of the passenger-seeking vehicle receiving an passenger's order and a time of the passenger being picked up by the passenger-seeking vehicle; and the passenger's order was received within the time segment.

Expected trip fare: suppose the trip fare of the mth order is $tf_m$, then the expected trip fare in zone $z_i$ during time interval t, $TF_i^t$, is calculated by the mean of $tf_m$ of all orders with $(lat_d, lng_d)$ in zone $z_i$ and $\tau_d$ in t. That is, in some embodiments, the expected trip fare for one of the time segments comprises a historical average trip fare for passenger's orders that were received in zone A within the time segment.

Expected passenger waiting time: $PW_i^t$ is equaled to the mean of passenger waiting time of all orders with drivers' pickup location $(lat_d, lng_d)$ in zone $z_i$ and pickup time $\tau_d$ in time interval t. That is, in some embodiments, the expected passenger waiting time for one of the time segments comprises a historical average waiting time for passenger orders placed in zone A and were received within the time segment; and the waiting time is a time difference between a time when the passenger order was placed and a time when the passenger was picked up.

Expected number of orders: $NO_i^t$ indicates the number of requested orders in zone $z_i$ during time interval t. That is, in some embodiments, the expected number of orders for one of the time segments comprises a historical average number of passenger orders in zone A within the time segment.

Expected answer rate: $AR_i^t$ denotes the ratio of the number of satisfied orders (successfully dispatched to drivers) to the number of requested orders in zone $z_i$ during time interval t. That is, in some embodiments, the expected answer rate comprises a number of satisfied passenger orders to a number of requested passenger orders in zone A within the time segment.

Expected drivers' stay time: consider 5-min time interval t, all the drivers with at least one GPS record belonged to zone $z_i$ can be selected, and the accumulative stay time of each driver can be calculated. Then the expected drivers' stay time, $DS_i^t$, equals to the mean of accumulative stay time of all drivers in zone $z_i$ within time interval t. That is, in some embodiments, the expected drivers' stay time comprises a historical average time for each passenger-seeking vehicle staying in zone A within the time segment.

Drivers' expectation can be assumed to be based on their experience and perception in many days, instead of one specific day. It is reasonable since drivers do not have real-time information, such as orders, pickup-time, trip fare, etc., thus they would be more likely to rely on their empirical observation than react to real-time information. Here, $F_i^t$ represents the vector of explanatory variables in zone $z_i$ and time interval t, i.e., $(PT_i^t, TF_i^t, PW_i^t, NO_i^t, AR_i^t, DS_i^t)'$.

Apart from comparing the expected profitability of the adjacent zones themselves, the drivers may also consider the expected profitability of the zones they would probably reach if they move to one of the adjacent zones. For example, when a driver starting from zone $z_i$ within time interval t, the expected reward of the movement from zone $z_i$ to zone $z_j$ (one of the adjacent zones of $z_i$) can be written as Eq. 2.

$$X_{ij}^t = (F_j^{t'}, \Sigma_{m \in A(j)} p(m|i,j) F_m^{t'}, \Sigma_{t \in A(m)} \Sigma_{m \in A(j)} p(l|i,j,m) F_l^{t'}, M_{ij})' \quad (2)$$

Where zone m is the possible zone the driver would reach when he/she drives the ride-sourcing vehicle from i to j, where p(m|i, j) refers to the probability of the vehicle moving to zone m after the driver takes a movement from i to j. Similarly, zone l refers to the potential alternative zone after the driver takes a sequential movement from i to j and to m, and p(l|i, j, m) denotes the probability of the decision to zone l under this condition. In this case, zone j, m, l are named as one-step, second-step, third-step potential adjacent zones, and $F_j^t$, $F_m^t$, $F_l^t$ are named as one-step, second-step, third-step explanatory variables. For the disclosed model, three steps of explanatory variables can be considered, since most of the vacant passenger-seeking movements are within three zones.

As mentioned, $\delta = 5$ min may be used to distinguish whether a ride-sourcing vehicle moves to adjacent zones or stays in the current zone. In some embodiments, there are much more "stay in the current zone" samples than "move to one of the adjacent zones" samples, thus a binary variable $M_{ij}$ (named movement factor) can be used to balance this sample bias. $M_{ij}$ equals to 1 if i≠j, and equals to 0 if i=j.

Various calibration steps are discussed below. Each movement, such as a movement from i to j in time interval t, is considered as a sample. The samples observed can be grouped by i, j, and t, and the number of samples in each group can be denoted as N(i, j, t). Then the likelihood function can be written as Eq. 3. Eq. 4 shows a log-likelihood function derived from Eq. 3. Among others, a difference between the disclosed zonal choice model and traditional multinomial logit model is that the choice set, such as A(i), is different across different groups of samples.

$$L(\beta) = \prod_{i,j,t} \left[ \frac{\exp(\beta' X_{ij}^t)}{\sum_{k \in A(i)} \exp(\beta' X_{ik}^t)} \right]^{N(i,j,t)} \quad (3)$$

$$LL(\beta) = \sum_{i,j,t} \left[ N(i, j, t) \cdot \log \frac{\exp(\beta' X_{ij}^t)}{\sum_{k \in A(i)} \exp(\beta' X_{ik}^t)} \right] \quad (4)$$

The first-order derivative of $LL(\beta)$ is derived in Eq. 5. It can be found that the second part of the right-hand-side can be grouped by (i, t) instead of (i, j, t), which implies that the term $$\sum_{l \in A(i)} \left[ \frac{\exp(\beta' X_{il}^t)}{\sum_{k \in A(i)} \exp(\beta' X_{ik}^t)} X_{il}^t \right]$$

is the same for all samples starting from zone i within time interval t. With this grouping technique, the calculation of ∝LL(β)/∝β in each iteration only requires two loops (i, t) instead of three loops (i, j, t), which greatly reduces the computation complexity.

$$\frac{\partial LL(\beta)}{\partial \beta} = \sum_{i,j,t}[N(i,j,t)X_{i,j}^t] - \sum_{i,t}\left\{N(i,t)\sum_{l \in A(i)}\left[\frac{\exp(\beta' X_{il}^t)}{\sum_{k \in A(i)}\exp(\beta' X_{ik}^t)}X_{il}^t\right]\right\} \quad (5)$$

Letting the first-order derivative to be zero, the β which makes the likelihood function LL(β) maximal can be obtained. In Eq. 5, the first part of the right-hand-side refers to the summation of all observed explanatory variables, while the second part of the right-hand-side indicates the expected explanatory variables produced by the model conditional on β. Intuitively, with the β making the first part equaled to the second part, the observations are most probable. Note that the closed form of ∝LL(β)/∝β=0 is hard to obtain, a gradient descent algorithm is used to get the optimal β (as shown in Eq. 6).

$$\beta = \beta + \alpha \frac{\partial LL(\beta)}{\partial \beta} \quad (6)$$

Where α is a parameter controlling the learning rate of the gradient descent algorithm.

To determine the significance of the kth coefficient $\beta_k$, a null hypothesis $H_0: \beta_k = 0$ can be used. The maximum likelihood parameter estimates are asymptotically distributed, so the z-score for each $\beta_k$ can be calculated, which asymptotically follows a standard normal distribution (shown in Eq. 7).

$$z = \frac{\hat{\beta}_k - 0}{\sqrt{[\text{var}(\beta)]_{k,k}}} \sim N(0, 1) \quad (7)$$

Where var(β) is the variance-covariance matrix of β, and $[\text{var}(\beta)]_{k,k}$ means the kth diagonal element of var(β). If the z-score is larger/smaller than a certain positive/negative threshold (confidential level), the null hypothesis can be rejected, which indicates the coefficient $\beta_k$ is positively/negatively significant. The var(β) can be calculated by the inverse of fisher information matrix I(β), which is estimated by the negative hessian matrix H(β). For example, var(β)= $[I(\beta)]^{-1} = [-H(\beta)]^{-1}$. The hessian matrix H(β) can be derived by calculating the second derivatives of the likelihood function (see Eq. 8).

$$H(\beta) = \frac{\partial^2 LL}{\partial \beta^2} = \sum_{i,\tau}\left\{N(i,\tau)\sum_{l \in A(i)}\left[\frac{\exp(\beta' X_{il}^{(\tau)})}{\sum_{k \in A(i)}\exp(\beta' X_{ik}^{(\tau)})}\right.\right. \\ \left.\left.\left\{X_{il}^{(\tau)} - \sum_{m \in A(i)}\left[\frac{\exp(\beta' X_{im}^{(\tau)})}{\sum_{k \in A(i)}\exp(\beta' X_{ik}^{(\tau)})}X_{im}^{(\tau)}\right]\right\}X_{il}^{(\tau)'}\right]\right\} \quad (8)$$

In various embodiments, the disclosed zonal choice model can be applied to the real-world dataset. Data in the dataset may be referred to as historical vehicle service data. First, basic statistics and correlation of the explanatory variables are described below. Second, the drivers may be categorized into three types, including full-time driver, part-time diligent drivers and part-time lazy drivers, and their characteristics are compared. Different types of drivers' preferences to the explanatory variables can be learned by the zonal choice model.

In some embodiments, two datasets (of exemplary historical vehicle service data) are collected from a city during 10 working days. One dataset contains around 4.91 million requested orders, each of which is with the attributes described above. The orders are then aggregated and averaged by hexagon zones (e.g., by hexagon zones with 660 m-long side length and 5-min time intervals). The orders in the same time-interval, such as 6:00-6:05 AM, but in different days may be aggregated in one group, since the expected explanatory variables are more likely to depend on drivers' long-term empirical observation than short-term information. Thus, the explanatory variables, including pickup time, trip fare, answer rate, number of requested orders, passenger waiting time and drivers' mean staying time, are obtained in each time interval and each hexagon. Table 1 illustrates the mean and standard deviation of the explanatory variables. Before training the model, each explanatory variable may be normalized to a distribution with a zero mean and unit standard deviation.

The other dataset includes the trajectories of ride-sourcing drivers (e.g., 32,881 ride-sourcing drivers), who can be divided into various classes (e.g., three classes corresponding to 15,393 full-time drivers, 8,476 part-time diligent drivers, and 9,012 part-time lazy drivers). As discussed above, each trajectory may include a sequence of longitude, latitude, and time, recorded by the GPS each 3 second. The latitudes and longitudes are mapped into the hexagon lattices, and then a sequence of zonal-searching movements can be obtained. The case that a driver stays in one specific zone over 5 minutes may be treated as a "stay", for instance, movement from zone i to zone i. Those trajectories without any movement between two zones and with a total time duration less than 5 minutes may be removed from the dataset. After data processing, 535,330 vacant driver passenger-seeking movements, including 64.1% "stay" and 36.9% "move," can be attained as training samples.

Figure 2C:
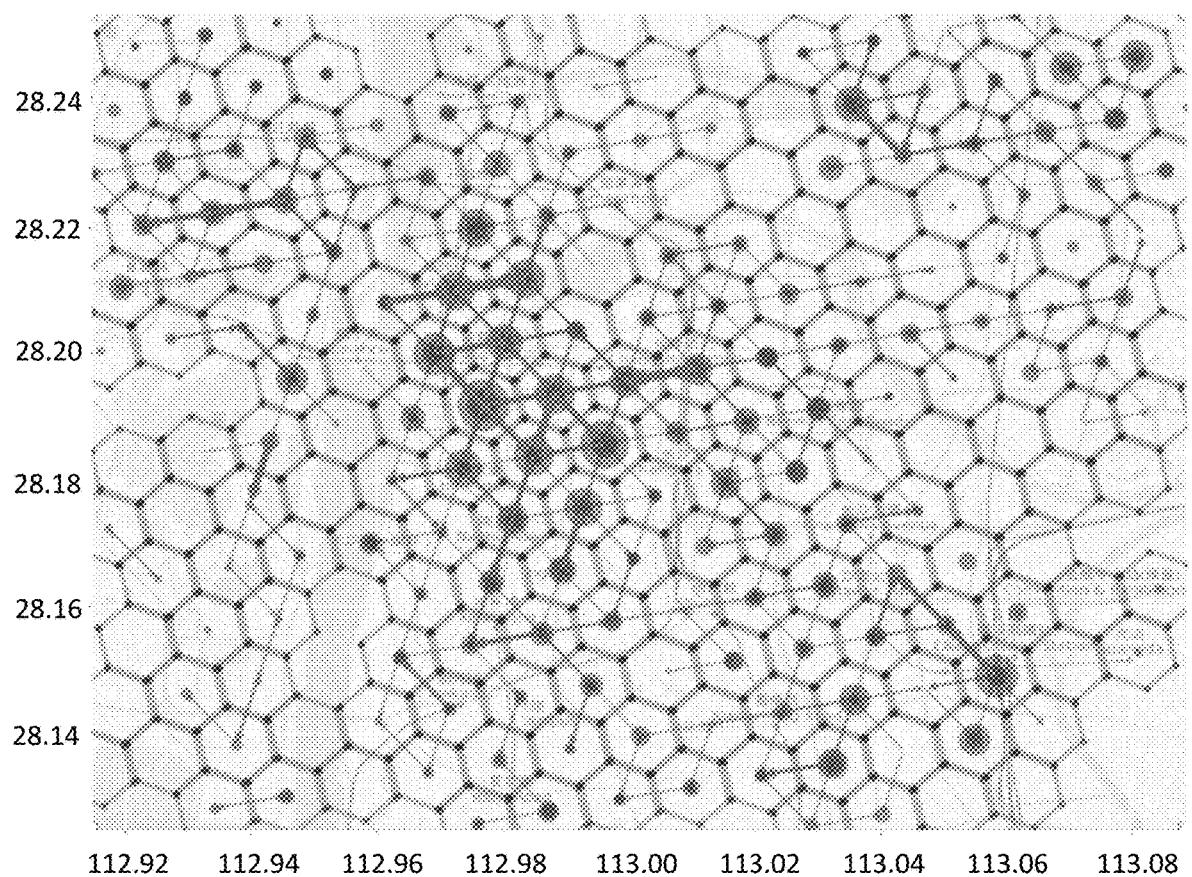
FIG. 2C illustrates exemplary driver's movements based on data analysis with the passenger-seeking ride-sourcing vehicle model, in accordance with various embodiments.
Figure 2D:
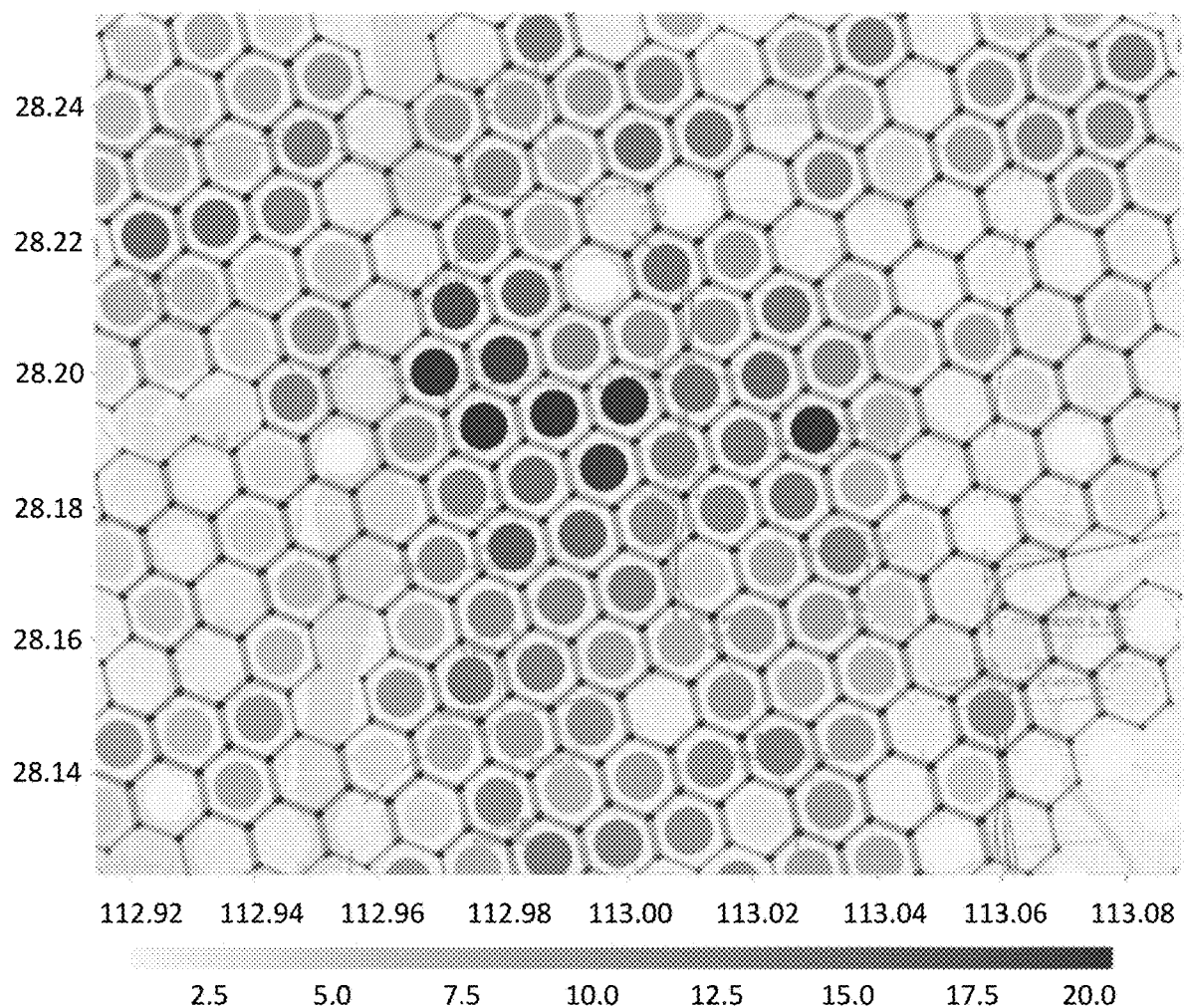
FIG. 2D illustrates exemplary requested orders' distribution based on data analysis with the passenger-seeking ride-sourcing vehicle model, in accordance with various embodiments.

The spatial distribution of the drivers' movements and requested orders are illustrated in FIG. 2C and FIG. 2D respectively. FIG. 2C illustrates exemplary driver's movements based on data analysis with the passenger-seeking ride-sourcing vehicle model, in accordance with various embodiments of the present disclosure. In FIG. 2C, the thickness of arrowed line between connected hexagons represents the number of samples moving from one hexagon zone to one of its adjacent hexagon zones ("move" action), and the green circle in a hexagon represents the number of samples staying in the current hexagon zone ("stay" action). The thicker the arrow, the lager the number of the "move" action, while the greater the circle, the larger the number of the "stay" action. FIG. 2D illustrates exemplary requested orders' distribution based on data analysis with the passenger-seeking ride-sourcing vehicle model, in accordance with various embodiments of the present disclosure. FIG. 2D shows the heat map of the mean number of orders within each 5-min time interval in each hexagon zone, where the deeper the color, the larger the mean number of orders. It is intuitively observed that the zones with high density of requested orders are more attractive to vacant drivers generally.

TABLE 1

Statistics of the explanatory variables

|  | PT (min) | TF(Yuan) | AR | NO | PW (min) | DS (min) |
|---|---|---|---|---|---|---|
| Mean | 3.49 | 16.53 | 0.90 | 5.65 | 0.11 | 2.28 |
| Standard deviation | 1.68 | 8.24 | 0.17 | 6.29 | 0.23 | 0.62 |

To avoid collinearity, the explanatory variables with low linear correlations can be selected. Table 2 shows the Pearson correlations between each pair of explanatory variables proposed described above. The expected passenger waiting time and expected pickup time has the highest correlation, i.e., 0.246. Long expected pickup time suggests that the platform has to dispatch drivers far-away from the passengers, which means a shortage of supply causes the long expected passenger waiting time. The expected number of requested orders and the expected answer rate has the most negative correlation, i.e. −0.311. The zones with a large number of requested orders would more probably to suffer from supply-demand gap, which reduces the answer rate.

TABLE 2

Correlation of the explanatory variables

|  | PT | TF | PW | AR | NO | DS |
|---|---|---|---|---|---|---|
| PT | 1.000 | 0.101 | 0.246 | −0.179 | 0.174 | −0.200 |
| TF | 0.101 | 1.000 | 0.057 | −0.054 | 0.039 | 0.056 |
| PW | 0.246 | 0.057 | 1.000 | −0.273 | 0.102 | −0.220 |
| AR | −0.179 | −0.054 | −0.273 | 1.000 | −0.311 | 0.135 |
| NO | 0.174 | 0.039 | 0.102 | −0.311 | 1.000 | −0.111 |
| DS | −0.200 | 0.056 | −0.220 | 0.135 | −0.111 | 1.000 |

Figure 3A:
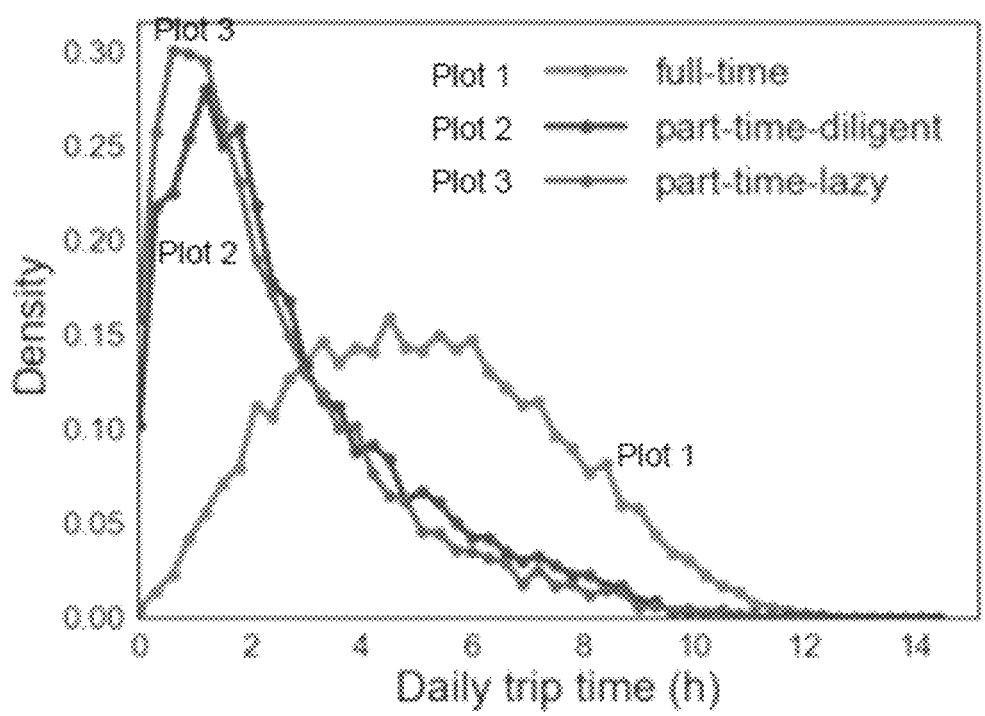
FIGS. 3A-3D illustrate various explanatory attributes of three types of drivers, in accordance with various embodiments of the present disclosure.
Figure 3B:
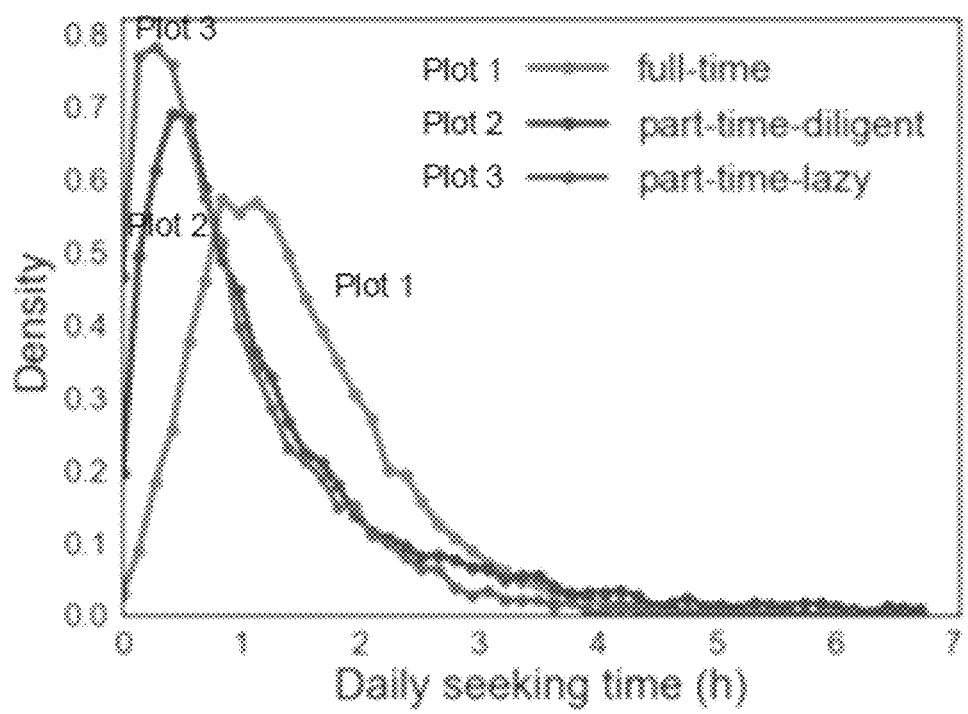
Figure 3C:
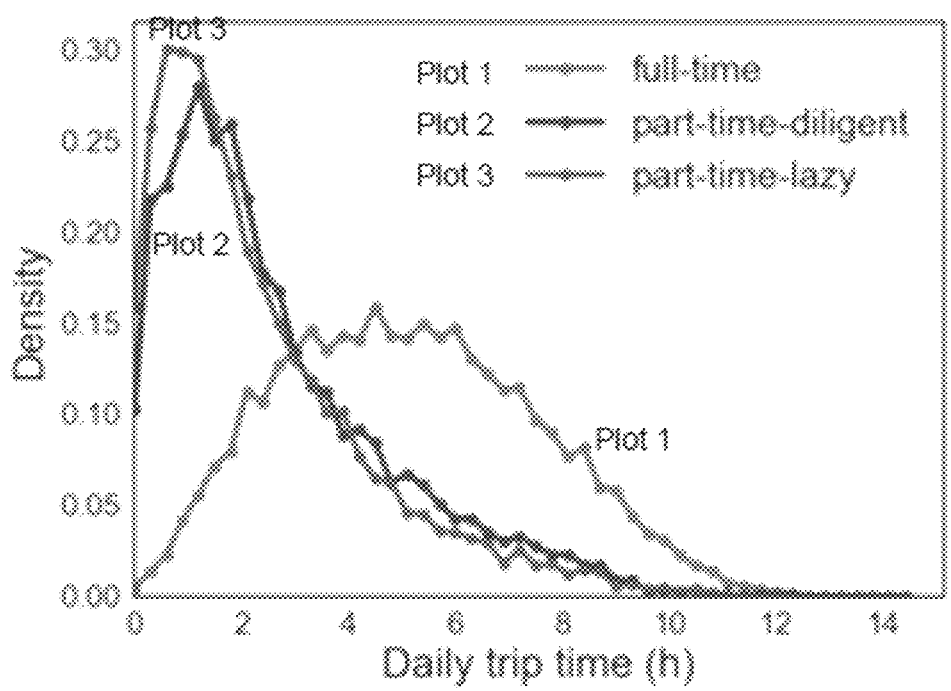
Figure 3D:
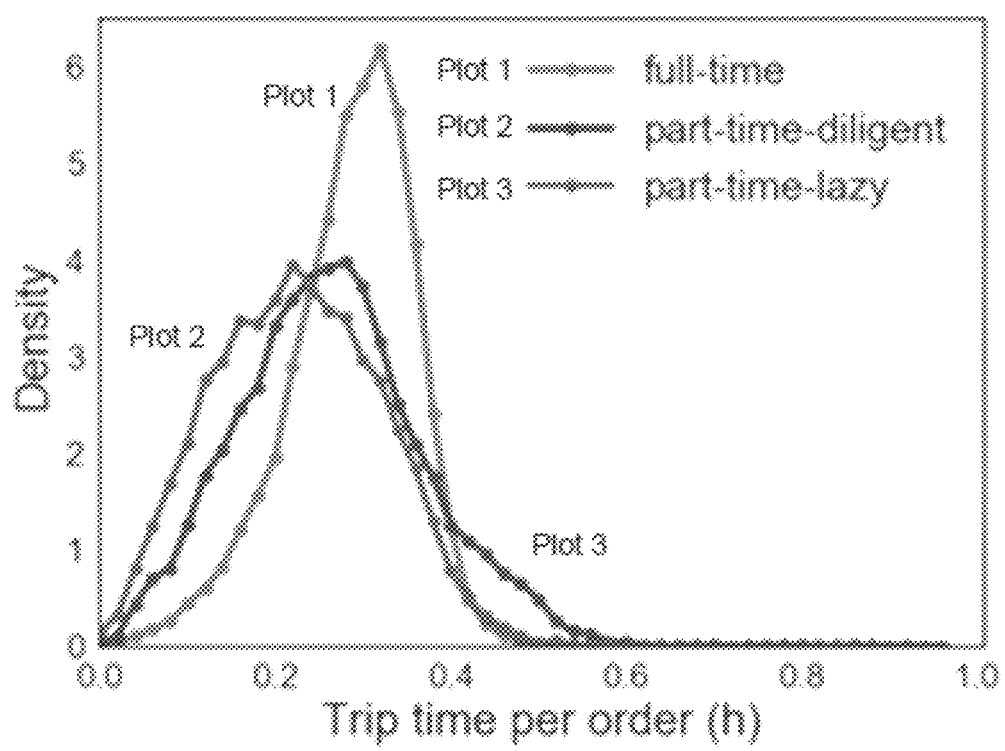

As abovementioned, the ride-sourcing drivers can be categorized into three classes, including full-time drivers, part-time diligent drivers, and part-time lazy drivers (e.g., by applying k-means clustering algorithm). The features fed into the k-means model for categorizing the drivers may include the working days per week, the working time per day, and drivers' registration information (car type, gender, age, etc.). FIGS. 3A-3D illustrate various explanatory attributes of three types of drivers, in accordance with various embodiments of the present disclosure. The probabilistic density function (PDF) of the attributes include trip time per day (FIG. 3A), vacant passenger-seeking time per day (FIG. 3B), number of days a driver works (FIG. 3C), and trip time per order (FIG. 3D), of the three types of drivers. Based on the data analysis by the disclosed model, plots show that full-time drivers have longer daily trip time (FIG. 3A) and longer daily vacant passenger-seeking time (FIG. 3B) than other two types of drivers, but the augmenter in daily trip time is larger than that in daily vacant passenger-seeking time. The analysis may imply that the full-time drivers have higher ratio of trip time versus vacant passenger-seeking time, which means they are more efficient. The full-time drivers have longest days-of-working, and the part-time laze drivers have shortest working days, in the investigated 10 days. FIG. 3D shows that full-time drivers have significantly longer mean trip time per order than part-time drivers, which indicates that full-time drivers are more likely to be successfully dispatched with long orders. The long orders generally have higher value than short orders and are therefore more attractive to drivers. This results may be attributed to two reasons: 1) the full-time drivers are more experienced and tend to cruise to the regions where there is higher probability of receiving long orders; 2) the full-time drivers cancel the short orders dispatched by the platform (for example, if each driver has three opportunities to cancel a dispatched order).

The regression results of zonal choice model for the three types of drivers are discussed below, including the drivers' preference on the explanatory variables of the adjacent zones, and the drivers' response to the explanatory variables of the zones they could probably reach in multiple subsequent steps. That is, drivers' preferences on one-step, two-step, and three-step explanatory variables may be analyzed for the above two datasets, due to two reasons: 1) only 18.1% of the trajectories cover over 4 hexagon zones (the third-step explanatory variables include attributes of the zones drivers could reach with 4 cross-zone movements), 2) each hexagon is sufficiently large (with 660-meter side length). Thus, the drivers may expect to be dispatched orders within three sequential zones, and the attributes of subsequent far-away zones may not be considered. Nevertheless, the model can be configured to analyze any number of steps.

Tables 3, 4, and 5 demonstrate the preferences (evaluated by coefficient z-score, and p-value) on first-step, second-step, and third-step explanatory variables of full-time, part-time diligent, and part-time lazy drivers, respectively. The z-score represents the significance of the corresponding coefficient the larger the magnitude of z-score, the more significant the coefficient. A positive/negative z-score infers that drivers have positive/negative response to the related explanatory variable. A p-value (correlated with z-score) less than 0.01 may be assumed to be significant. With this criterion, data analysis by the disclosed model provides the following.

1) The coefficient for movement factor $M_{ij}$ for three types of drivers are all negative, which indicates that the drivers tend to stay in the current hexagon zone instead of moving to adjacent zones, which is consistent to the sample distribution (64.1% "stay" samples). The z-score of $M_{ij}$ of full-time drivers is the most negative, followed by part-time diligent drivers and then part-time lazy drivers. It is reasonable, since full-time vacant drivers tend to stay to save the gas cost, or to have a rest after a long working time.

2) Among all the explanatory variables, the number of requested orders NO is the most positively significant. Full-time drivers have higher z-scores on $M_{ij}$ than part-time drivers, indicating that full-time drivers are more sensitive to zones with high requested orders. It makes sense since full-time drivers are generally more experienced than part-time drivers. Further, drivers' preferences on NO drop quickly with the increase of steps, which means the drivers react substantially to the expected requested orders in the nearby zones but do not care too much about the requested orders of far-away zones they would probably reach.

3) The coefficients on DS for three types of drivers are significantly positive. This could be explained by the "follow like sheep" behaviors of the drivers. The ride-sourcing drivers do not have complete information on the spatio-temporal supply-demand conditions, so they would gather together to the zones with a large number of orders, which lead to a sudden spike of supply and subsequently long drivers' cruising time. Also, the high-value area with higher demand and more long-distance orders, such as airport and rail station, attracts a larger number of drivers waiting in a queue.

4) Full-time drivers have more significant preferences on trip fare TF than part-time drivers. A high trip fare implies long orders, and thus the observation is consistent to FIG. 3D, where full-time drivers have higher mean trip time per order (indicating long orders). This reveals that full-time drivers prefer to cruise to regions with long orders, such as airports, railway stations, suburb residential regions in the morning peak, etc.

5) Drivers' preferences on other explanatory variables, including expected pickup time PT, expected answer rate AR, expected passenger waiting time PW, are generally not significant. It implies that drivers do not have detailed information on these explanatory variables and consequently do not rely on them for vacant passenger-seeking decisions.

TABLE 3

Full-time drivers' preferences to explanatory variables

| | | PT | TF | AR | NO | PW | DS | $M_{ij}$ |
|---|---|---|---|---|---|---|---|---|
| first-step | β | 0.016 | 0.024 | 0.007 | 0.166 | −0.001 | 0.112 | −1.701 |
| | z-score | 2.55 | 4.51 | 1.55 | 48.52 | −0.13 | 22.07 | −372.73 |
| | p value | 0.011 | 0.000 | 0.122 | 0.000 | 0.894 | 0.000 | 0.000 |
| second-step | β | 0.004 | 0.028 | −0.006 | −0.002 | −0.069 | 0.036 | |
| | z-score | 0.78 | 6.50 | −1.45 | −0.47 | −14.40 | 7.49 | |
| | p value | 0.438 | 0.000 | 0.148 | 0.639 | 0.000 | 0.000 | |
| third-step | β | 0.010 | 0.012 | −0.010 | 0.013 | −0.021 | 0.015 | |
| | z-score | 1.91 | 2.97 | −2.52 | 2.81 | −4.97 | 3.28 | |
| | p value | 0.056 | 0.003 | 0.012 | 0.005 | 0.000 | 0.001 | |

TABLE 4

Part-time diligent drivers' preferences to explanatory variables

| | | PT | TF | AR | NO | PW | DS | $M_{ij}$ |
|---|---|---|---|---|---|---|---|---|
| first-step | β | 0.051 | 0.018 | 0.029 | 0.136 | 0.008 | 0.079 | −1.056 |
| | z-score | 3.648 | 1.412 | 2.718 | 19.772 | 0.490 | 6.996 | −101.719 |
| | p value | 0.000 | 0.158 | 0.007 | 0.000 | 0.624 | 0.000 | 0.000 |
| second-step | β | −0.001 | 0.031 | −0.005 | 0.051 | −0.051 | 0.030 | |
| | z-score | −0.091 | 3.016 | −0.464 | 6.060 | −4.830 | 3.000 | |
| | p value | 0.927 | 0.003 | 0.643 | 0.000 | 0.000 | 0.003 | |
| third-step | β | 0.027 | 0.002 | 0.002 | 0.000 | −0.009 | 0.020 | |
| | z-score | 2.232 | 0.184 | 0.192 | −0.044 | −0.976 | 2.291 | |
| | p value | 0.026 | 0.854 | 0.847 | 0.965 | 0.329 | 0.022 | |

TABLE 5

Part-time lazy drivers' preferences to explanatory variables

| | | PT | TF | AR | NO | PW | DS | $M_{ij}$ |
|---|---|---|---|---|---|---|---|---|
| first-step | β | 0.033 | 0.019 | 0.016 | 0.131 | 0.003 | 0.066 | −0.927 |
| | z-score | 2.138 | 1.389 | 1.379 | 16.726 | 0.169 | 5.500 | −81.405 |
| | p value | 0.033 | 0.165 | 0.168 | 0.000 | 0.866 | 0.000 | 0.000 |
| second-step | β | 0.005 | 0.016 | −0.018 | 0.033 | −0.056 | 0.027 | |
| | z-score | 0.373 | 1.598 | −1.962 | 3.795 | −5.772 | 2.795 | |
| | p value | 0.709 | 0.110 | 0.050 | 0.000 | 0.000 | 0.005 | |
| third-step | β | 0.009 | −0.008 | 0.010 | 0.021 | −0.004 | −0.001 | |
| | z-score | 0.854 | −0.867 | 1.355 | 2.525 | −0.441 | −0.147 | |
| | p value | 0.393 | 0.386 | 0.175 | 0.012 | 0.659 | 0.883 | |

As shown, the simulation can provide valuable insights for the ride-sourcing platform/traffic manager. For example, the simulation analysis shows that the drivers could over-react to zones with high demand and flow over into these zones, leading to a short-term over-supply condition. This negative effect is created by the information asymmetry between the platform and the drivers and can be alleviated if the platform provides real-time spatial supply-demand information to the drivers. Due to drivers' incomplete information and "follow like sheep" behaviors, they may not plan the optimal vacant passenger-seeking routes. Therefore, some applications or policies can be developed to improve the overall efficiency and reduce search frictions: 1) passenger-seeking route recommendations for passenger-seeking drivers; 2) vacant drivers' dispatching with small award; and 3) spatio-temporal subsidy strategies which attracts drivers to zones with lower demand than supply.

FIG. 4 illustrates a flowchart of an exemplary method 400 for determining passenger-seeking ride-sourcing vehicle navigation, according to various embodiments of the present disclosure. The exemplary method 400 may be implemented in various environments including, for example, the environment 100 of FIG. 1. The exemplary method 400 may be implemented by one or more components of the system 102 (e.g., the processor 104, the memory 106). The method 400 may be implemented by multiple systems similar to the system 102. The operations of method 400 presented below are intended to be illustrative. Depending on the implementation, the exemplary method 400 may include additional, fewer, or alternative steps performed in various orders or in parallel.

Block 401 may comprise obtaining historical vehicle service data in an area for a time period, the historical vehicle service data including historical locations of passenger-seeking vehicles with respect to time, historical locations of passenger orders with respect to time, and historical trip fares with respect to pick-up locations and time. Block 402 may comprise discretizing the area into a plurality of zones (e.g., repeating zones) and discretizing the time period into a plurality of time segments. Block 403 may comprise aggregating the historical vehicle service data according to the zones and time segments. Block 404 may comprise obtaining an expected reward for a passenger-seeking vehicle to move from zone A to each neighboring zone of the zone A based on the aggregated historical vehicle service data (e.g., equation 2 described above). Block 405 may comprise obtaining a probability of the passenger-seeking vehicle moving from zone A to a neighboring zone B based on the expected reward for a passenger-seeking vehicle to move from zone A to the each neighboring zone of the zone A (e.g., equation 1 described above).

In some embodiments, as described above, each of the zones is hexagonal and is connected to six neighboring zones on each side. The expected reward (e.g., $X_{ij}^{t'}$) for the passenger-seeking vehicle to move from zone A (e.g., zone $z_i$) to each neighboring zone of the zone A is based on one or more explanatory variables; and the explanatory variables comprise at least one of: an expected pickup time (e.g., $PT_i^{t'}$), an expected trip fare (e.g., $TF_i^{t'}$), an expected passenger waiting time (e.g., $PW_i^{t'}$), an expected number of orders (e.g., $NO_i^{t'}$), an expected answer rate (e.g., $AR_i^{t'}$), or an expected drivers' stay time (e.g., $DS_i^{t'}$).

In some embodiments, as described above, the explanatory variables comprise one-step explanatory variables (e.g., $F_j^{t'}$), two-step explanatory variables (e.g., $F_m^{t'}$), and three-step explanatory variables (e.g., $F_l^{t'}$); the one-step explanatory variables comprise vectors of: the expected pickup time, the expected trip fare, the expected passenger waiting time, the expected number of orders, the expected answer rate, and the expected drivers' stay time in zone B; the two-step explanatory variables comprise vectors of: the expected pickup time, the expected trip fare, the expected passenger waiting time, the expected number of orders, the expected answer rate, and the expected drivers' stay time in zone C, the zone C being a neighboring zone of zone B; and the three-step explanatory variables comprise vectors of: the expected pickup time, the expected trip fare, the expected passenger waiting time, the expected number of orders, the expected answer rate, and the expected drivers' stay time in zone D, the zone D being a neighboring zone of zone C.

As such, the passenger-seeking behaviors of drivers in the ride-sourcing platform can be clearly modeled by the disclosed model, overcome the deficiency of existing technologies. Unlike taxi drivers, who cruise in the street for picking up passengers, the ride-sourcing drivers are dispatched with orders from the platform. However, the platform does not provide any information on the attributes of nearby regions to the drivers. In such case, ride-sourcing drivers suffer from higher uncertainty and have to "guess" the platform's dispatching strategies. The disclosed model provides a pathway to understand these drivers' passenger-seeking behaviors, and preferences to the explanatory variables can help the platform/traffic operator design strategies for incentivizing drivers to make optimal zonal choice.

Unlike square-like zones in existing technologies, the zones used in this model can be hexagon lattices, which has an unambiguous definition of the neighborhood. Six categories of explanatory variables, including expected pickup time, expected trip fare, expected number of requested orders, expected answer rate, expected passengers' waiting time, and expected drivers' staying time in one zone, can be fed into the zonal choice model. Apart from regressing on the explanatory variables of the adjacent zones, the coefficient of the explanatory variables of the zones the drivers could probably reach within two and three steps can be estimated.

The disclosed model reveals key information from the data analysis to help improve transportation efficiency. Firstly, drivers have the strongest preference on the expected number of requested orders, and full-time drivers are more experienced than part-time drivers. Secondly, drivers tend to move to zones with high drivers' staying time. One possible reason might be that some drivers over-react to highly demanded adjacent zones and flow over into these zones. As a result, these zones are filled with overfull drivers and subsequently drivers would bear a longer passenger-seeking time. Another reason is that drivers prefer to queue in zones, such as railway stations and airports, which are with a large number of long-distance orders (more attractive to drivers). These findings enabled by the disclosed model are insightful for the platform/traffic operator, which can reduce information asymmetry by sharing more information, and design applications like vacant route recommendation and vacant car dispatching strategies.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
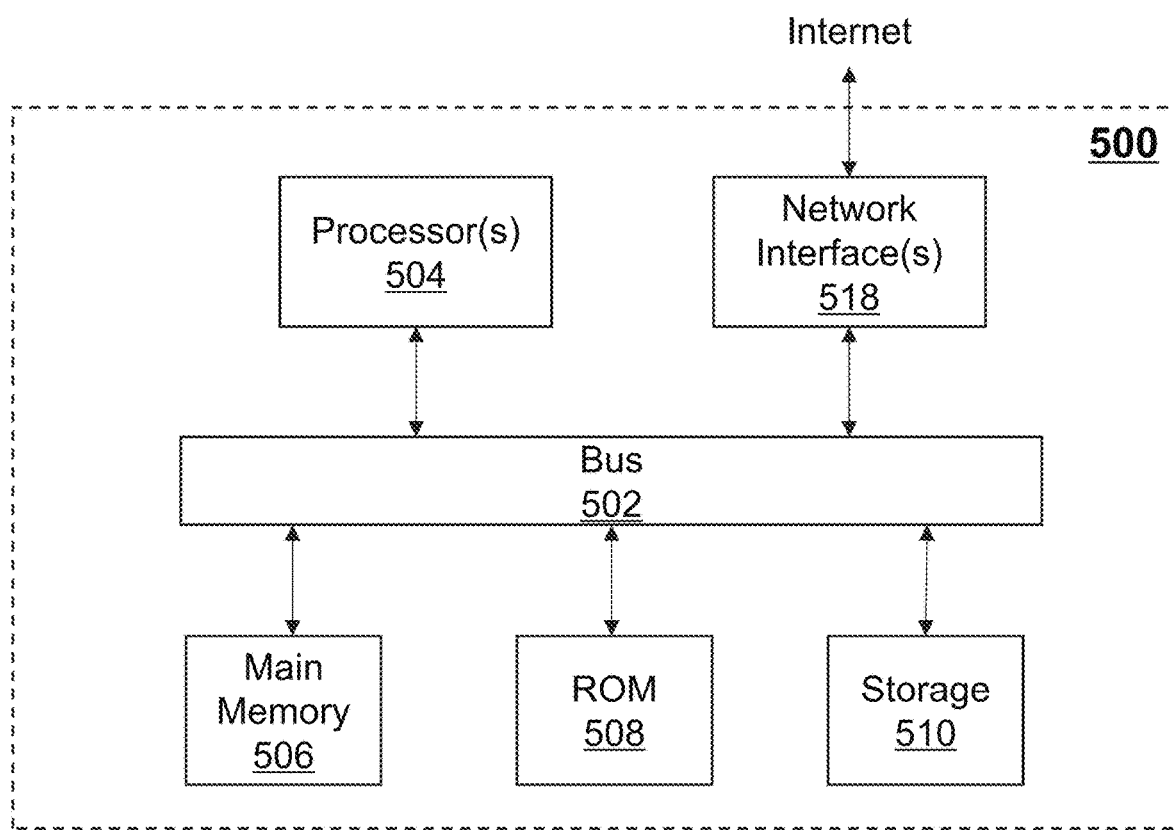
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed. The Detailed Description is not to be taken in a limiting sense, and the scope of various embodiments is defined only by the appended claims, along with the full range of equivalents to which such claims are entitled.

We claim:

1. A method for determining passenger-seeking ride-sourcing vehicle navigation, comprising:
obtaining historical vehicle service data in an area for a time period;

discretizing the area into a plurality of zones and discretizing the time period into a plurality of time segments;

aggregating the historical vehicle service data according to the plurality of zones and the plurality of time segments;

obtaining an expected reward for a passenger-seeking ride-sourcing vehicle to move from zone A to each neighboring zone of the zone A within one of the plurality of time segments based on the aggregated historical vehicle service data associated with one or more explanatory variables including at least an expected driver stay time, wherein the expected driver stay time comprises a historical average time for one or more passenger-seeking ride-sourcing vehicles staying in zone A within the one of the plurality of time segments;

determining a probability of the passenger-seeking ride-sourcing vehicle moving from zone A where the passenger-seeking ride-sourcing vehicle is located to a neighboring zone B based at least on the expected rewards for the passenger-seeking ride-sourcing vehicle to move from zone A to the each neighboring zone of the zone A; and navigating the passenger-seeking ride-sourcing vehicle based on the determined probability.

2. The method of claim 1, wherein the historical vehicle service data includes historical locations of passenger-seeking ride-sourcing vehicles with respect to time, historical locations of passenger orders with respect to time, and historical trip fares with respect to pick-up locations and time.

3. The method of claim 1, wherein:
the expected reward for the passenger-seeking ride-sourcing vehicle to move from zone A to the each neighboring zone of the zone A is based on one or more explanatory variables; and
the explanatory variables comprise at least one of: an expected pickup time, an expected trip fare, an expected passenger waiting time, an expected number of orders, an expected answer rate, or the expected driver stay time.

4. The method of claim 3, wherein:
the explanatory variables comprise one-step explanatory variables, two-step explanatory variables, and three-step explanatory variables;
the one-step explanatory variables comprise vectors of: the expected pickup time, the expected trip fare, the expected passenger waiting time, the expected number of orders, the expected answer rate, and the expected driver stay time in zone B;
the two-step explanatory variables comprise vectors of: the expected pickup time, the expected trip fare, the expected passenger waiting time, the expected number of orders, the expected answer rate, and the expected driver stay time in zone C, the zone C being a neighboring zone of zone B; and
the three-step explanatory variables comprise vectors of: the expected pickup time, the expected trip fare, the expected passenger waiting time, the expected number of orders, the expected answer rate, and the expected driver stay time in zone D, the zone D being a neighboring zone of zone C.

5. The method of claim 3, wherein:
the expected pickup time for the one of the plurality of time segments comprises a historical average pick-up time for passenger-seeking ride-sourcing vehicles to pick up passengers in zone A;
the pick-up time is a time difference between a time of the passenger-seeking ride-sourcing vehicle receiving an order of a passenger and a time of the passenger being picked up by the passenger-seeking ride-sourcing vehicle; and
the order of the passenger was received within the one of the plurality of time segments.

6. The method of claim 3, wherein:
the expected trip fare for the one of the plurality of time segments comprises a historical average trip fare for passenger's orders that were received in zone A within the one of the plurality of time segments.

7. The method of claim 3, wherein:
the expected passenger waiting time for one of the plurality of time segments comprises a historical average waiting time for passenger orders placed in zone A and received within the one of the plurality of time segments; and
the waiting time is a time difference between a time when a passenger order was placed and a time when the passenger was picked up.

8. The method of claim 3, wherein:
the expected number of orders for one of the plurality of time segments comprises a historical average number of passenger orders in zone A within the one of the plurality of time segments.

9. The method of claim 3, wherein:
the expected answer rate comprises a number of satisfied passenger orders to a number of requested passenger orders in zone A within the one of the plurality of time segments.

10. A non-transitory computer-readable storage medium storing instructions that, when executed by one or more processors, cause the one or more processors to perform a method for determining passenger-seeking ride-sourcing vehicle navigation, the method comprising:
obtaining historical vehicle service data in an area for a time period;
discretizing the area into a plurality of zones and discretizing the time period into a plurality of time segments;
aggregating the historical vehicle service data according to the plurality of zones and the plurality of time segments;
obtaining an expected reward for a passenger-seeking ride-sourcing vehicle to move from zone A to each neighboring zone of the zone A within one of the plurality of time segments based on the aggregated historical vehicle service data associated with one or more explanatory variables including at least an expected driver stay time, wherein the expected driver stay time comprises a historical average time for one or more passenger-seeking ride-sourcing vehicles staying in zone A within the one of the plurality of time segments;
determining a probability of the passenger-seeking ride-sourcing vehicle moving from zone A where the passenger-seeking ride-sourcing vehicle is located to a neighboring zone B based at least on the expected rewards for the passenger-seeking ride-sourcing vehicle to move from zone A to the each neighboring zone of the zone A; and
navigating the passenger-seeking ride-sourcing vehicle based on the determined probability.

11. The non-transitory computer-readable storage medium of claim 10, wherein the historical vehicle service data includes historical locations of passenger-seeking ride-sourcing vehicles with respect to time, historical locations of passenger orders with respect to time, and historical trip fares with respect to pick-up locations and time.

12. The non-transitory computer-readable storage medium of claim 10, wherein:
the expected reward for the passenger-seeking ride-sourcing vehicle to move from zone A to the each neighboring zone of the zone A is based on one or more explanatory variables; and
the explanatory variables comprise at least one of: an expected pickup time, an expected trip fare, an expected passenger waiting time, an expected number of orders, an expected answer rate, or the expected driver stay time.

13. The non-transitory computer-readable storage medium of claim 12, wherein:
the explanatory variables comprise one-step explanatory variables, two-step explanatory variables, and three-step explanatory variables;
the one-step explanatory variables comprise vectors of: the expected pickup time, the expected trip fare, the expected passenger waiting time, the expected number of orders, the expected answer rate, and the expected driver stay time in zone B;
the two-step explanatory variables comprise vectors of: the expected pickup time, the expected trip fare, the expected passenger waiting time, the expected number of orders, the expected answer rate, and the expected driver stay time in zone C, the zone C being a neighboring zone of zone B; and
the three-step explanatory variables comprise vectors of: the expected pickup time, the expected trip fare, the expected passenger waiting time, the expected number of orders, the expected answer rate, and the expected driver stay time in zone D, the zone D being a neighboring zone of zone C.

14. The non-transitory computer-readable storage medium of claim 12, wherein:
the expected pickup time for the one of the plurality of time segments comprises a historical average pick-up time for passenger-seeking ride-sourcing vehicles to pick up passengers in zone A;
the pick-up time is a time difference between a time of the passenger-seeking ride-sourcing vehicle receiving an order of a passenger and a time of the passenger being picked up by the passenger-seeking ride-sourcing vehicle; and
the order of the passenger was received within the one of the plurality of time segments.

15. The non-transitory computer-readable storage medium of claim 12, wherein:
the expected trip fare for one of the one of the plurality of time segments comprises a historical average trip fare for passenger's orders that were received in zone A within the one of the plurality of time segments.

16. The non-transitory computer-readable storage medium of claim 12, wherein:
the expected passenger waiting time for one of the one of the plurality of time segments comprises a historical average waiting time for passenger orders placed in zone A and were received within the one of the plurality of time segments; and
the waiting time is a time difference between a time when a passenger order was placed and a time when the passenger was picked up.

17. The non-transitory computer-readable storage medium of claim 12, wherein:
the expected number of orders for the one of the plurality of time segments comprises a historical average number of passenger orders in zone A within the one of the plurality of time segments.

18. The non-transitory computer-readable storage medium of claim 12, wherein:
the expected answer rate comprises a number of satisfied passenger orders to a number of requested passenger orders in zone A within the one of the plurality of time segments.

19. A system for determining passenger-seeking ride-sourcing vehicle navigation, comprising one or more processors and a non-transitory computer-readable storage medium storing instructions that, when executed by the one or more processors, cause the one or more processors to perform a method, the method comprising:
obtaining historical vehicle service data in an area for a time period;
discretizing the area into a plurality of zones and discretizing the time period into a plurality of time segments;
aggregating the historical vehicle service data according to the plurality of zones and the plurality of time segments;
obtaining an expected reward for a passenger-seeking ride-sourcing vehicle to move from zone A to each neighboring zone of the zone A within one of the plurality of time segments based on the aggregated historical vehicle service data associated with one or more explanatory variables including at least an expected driver stay time, wherein the expected driver stay time comprises a historical average time for one or more passenger-seeking ride-sourcing vehicles staying in zone A within the one of the plurality of time segments;
determining a probability of the passenger-seeking ride-sourcing vehicle moving from zone A where the passenger-seeking ride-sourcing vehicle is located to a neighboring zone B based at least on the expected rewards for the passenger-seeking ride-sourcing vehicle to move from zone A to the each neighboring zone of the zone A; and
navigating the passenger-seeking ride-sourcing vehicle based on the determined probability.

* * * * *